United States Patent
Sugai et al.

(10) Patent No.: US 10,516,956 B2
(45) Date of Patent: Dec. 24, 2019

(54) FAILURE DETECTION DEVICE, FAILURE DETECTION SYSTEM, AND FAILURE DETECTION METHOD

(71) Applicant: ALPINE ELECTRONICS, INC., Ota-ku, Tokyo (JP)

(72) Inventors: Taku Sugai, Iwaki (JP); Nozomu Saito, Tokyo (JP); Jyoji Yamada, Iwaki (JP); Isamu Takaku, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/387,099

(22) Filed: Apr. 17, 2019

(65) Prior Publication Data

US 2019/0342680 A1 Nov. 7, 2019

(30) Foreign Application Priority Data

May 1, 2018 (JP) .................... 2018-088353

(51) Int. Cl.
*H04R 29/00* (2006.01)
*G10L 19/018* (2013.01)
*B60Q 5/00* (2006.01)

(52) U.S. Cl.
CPC .......... *H04R 29/001* (2013.01); *G10L 19/018* (2013.01); *B60Q 5/006* (2013.01)

(58) Field of Classification Search
CPC .... H04R 29/001; H04R 29/00; H04R 29/004; H04R 27/00; H04R 2499/13; H04R 5/02;
(Continued)

(56) References Cited

U.S. PATENT DOCUMENTS

| 8,655,655 B2 * | 2/2014 | Wang | G10L 25/48 704/216 |
| 2003/0018479 A1 * | 1/2003 | Oh | G10L 19/018 704/275 |

(Continued)

FOREIGN PATENT DOCUMENTS

| EP | 1278183 | 1/2003 |
| EP | 2738042 | 6/2014 |

(Continued)

OTHER PUBLICATIONS

Extended European Search Report for 19171553.1 dated Sep. 18, 2019, 9 pgs.

*Primary Examiner* — Ahmad F. Matar
*Assistant Examiner* — Sabrina Diaz
(74) *Attorney, Agent, or Firm* — Brinks Gilson & Lione

(57) ABSTRACT

A failure detection device for detecting a failure of a sound generating device outputting a sound based on sound data from a speaker includes: an electronic watermark signal generating unit configured to generate an electronic watermark signal including collation data used for collation of whether or not a sound is output from the speaker; the speaker configured to output the electronic watermark signal as a sound; a microphone configured to collect the sound output from the speaker; a collation data detection unit configured to detect the collation data from the electronic watermark signal included in the sound collected by the microphone; and a failure determination unit configured to determine the presence or absence of the failure of the sound generating device by collating the collation data detected by the collation data detection unit with the collation data included in the electronic watermark signal.

17 Claims, 15 Drawing Sheets

(58) Field of Classification Search
CPC ....... G10L 19/018; B60Q 5/006; H04S 7/301; B60R 11/0217
USPC .............................................. 381/59, 58, 86
See application file for complete search history.

(56) References Cited

U.S. PATENT DOCUMENTS

| | | | |
|---|---|---|---|
| 2012/0274459 A1 | 11/2012 | Jaisimha et al. | |
| 2012/0290297 A1* | 11/2012 | Baughman | G10L 17/22 704/233 |
| 2013/0022230 A1* | 1/2013 | Tadano | G06F 21/16 382/100 |
| 2016/0049154 A1* | 2/2016 | Chen | G10L 19/018 700/94 |

FOREIGN PATENT DOCUMENTS

| | | |
|---|---|---|
| EP | 2871095 | 5/2015 |
| JP | 2003-274491 | 9/2003 |
| WO | WO2013/118250 | 8/2013 |

\* cited by examiner

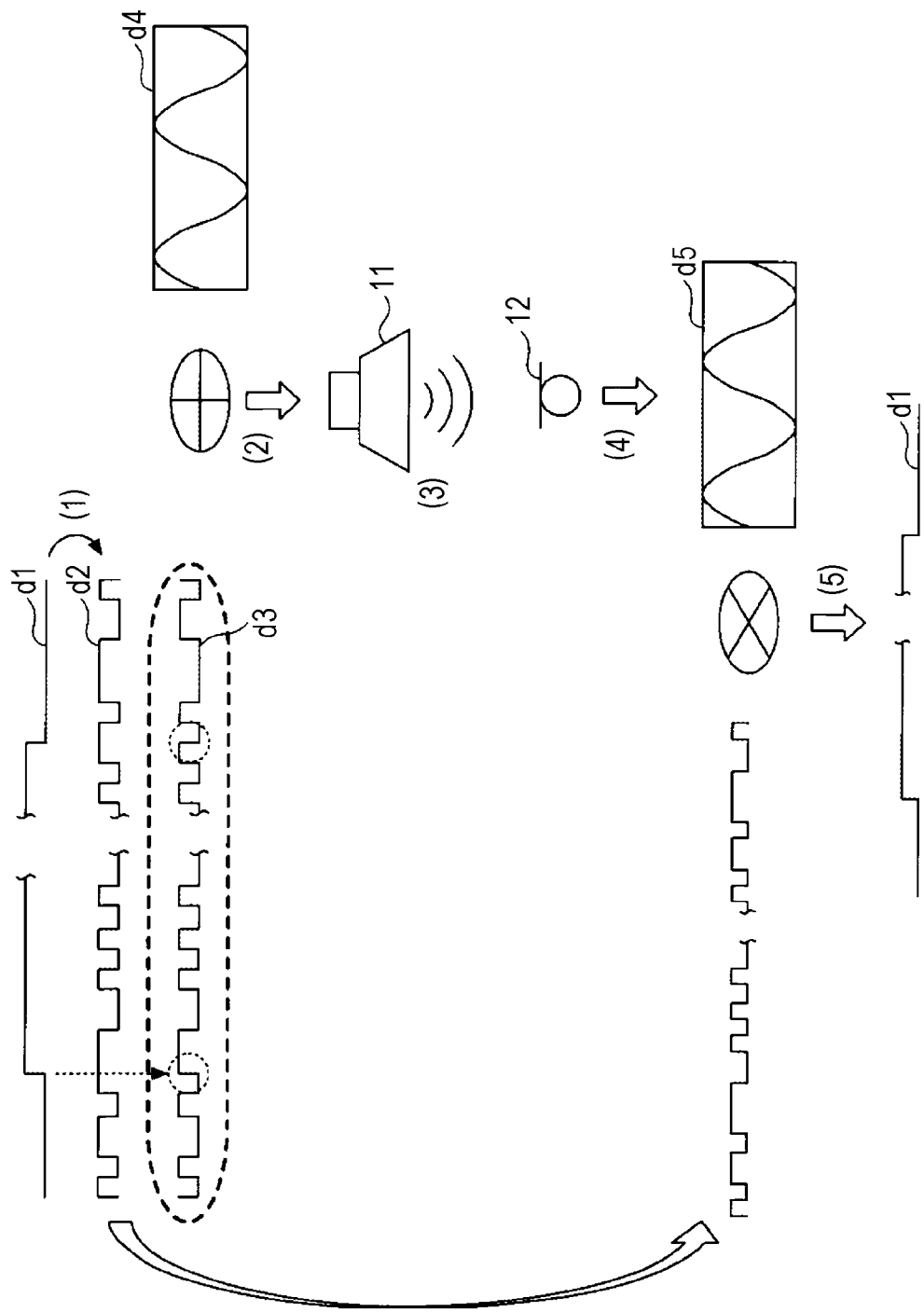

FIG. 13

|  | ELECTRONIC WATERMARK DETERMINATION OK | ELECTRONIC WATERMARK DETERMINATION NG |
|---|---|---|
| IMPEDANCE MEASUREMENT OK | (i) NO PROBLEM AS SYSTEM | (iii) FAILURE IN FAILURE DETECTION DEVICE OR MICROPHONE |
| IMPEDANCE MEASUREMENT NG | (ii) FAILURE IN IMPEDANCE MEASUREMENT DEVICE OR FALSE DETECTION DUE TO NOTIFICATION SOUND OF OTHER VEHICLE | (iv) DEFINITE FAILURE IN SYSTEM |

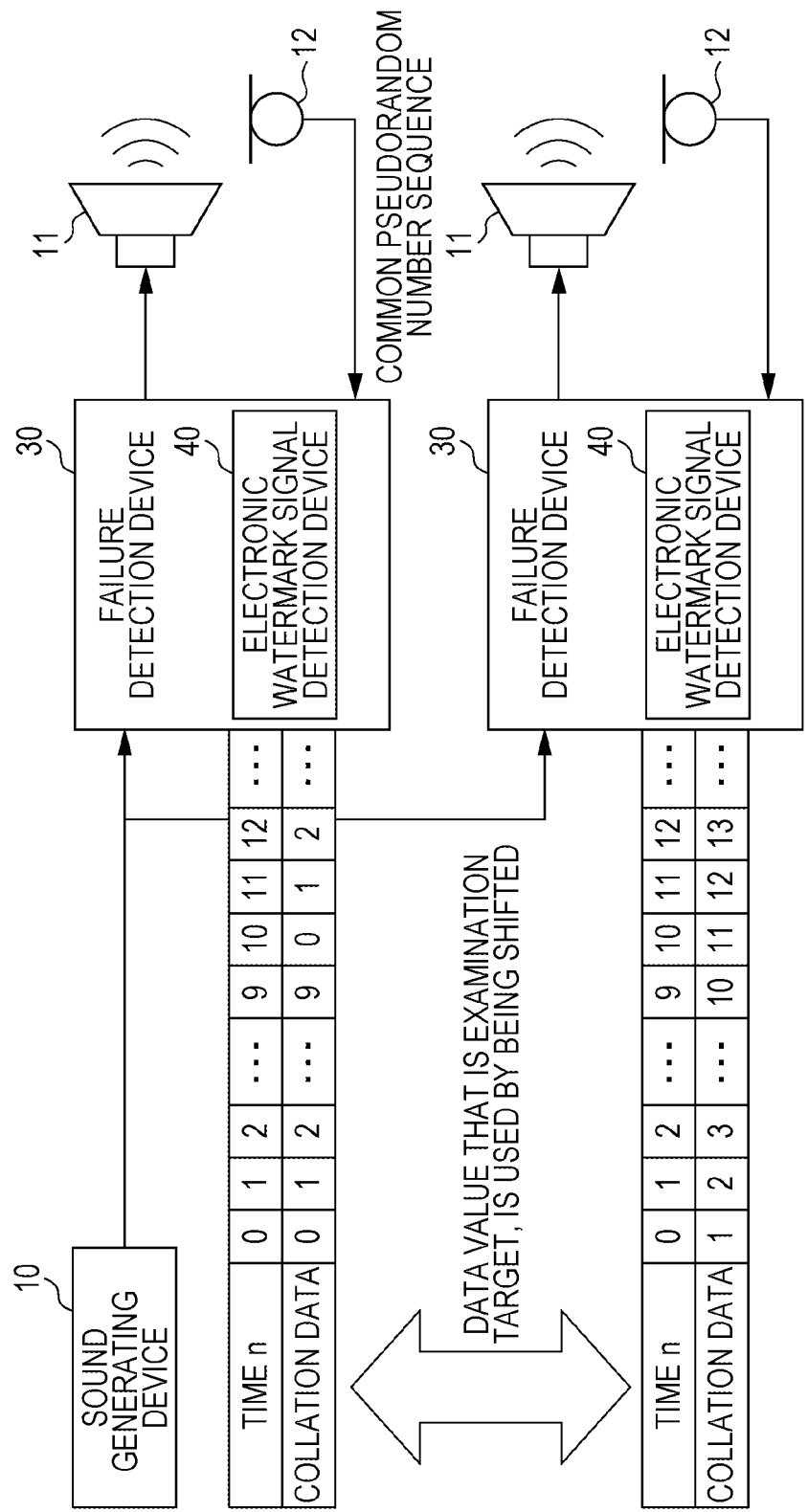

FAILURE DETECTION DEVICE, FAILURE DETECTION SYSTEM, AND FAILURE DETECTION METHOD

RELATED APPLICATION

The present application claims priority to Japanese Patent Application Number 2018-088353, filed May 1, 2018, the entirety of which is hereby incorporated by reference.

BACKGROUND

1. Field of the Invention

The present invention relates to a failure detection device, a failure detection system, and a failure detection method.

2. Description of the Related Art

An eco-car with less discharge amount of exhaust gas or carbon dioxide, such as an electric vehicle, a hybrid vehicle, a plug-in hybrid vehicle, or a fuel cell vehicle, has been in widespread use. There are various factors such as a demand for improving fuel consumption (electricity consumption), a reduction in an environmental load, and technical innovation, but it is expected that the eco-car will be in widespread use in the future. However, the eco-car traveling by a motor does not make a traveling sound that is generated by internal combustion such as a reciprocating engine, and thus, it has been pointed out that it is difficult for a pedestrian or the like to recognize the approach of the eco-car. For example, there is a case where a person with impaired vision perceives the approach of a vehicle by the traveling sound, but an expert has pointed out that it is difficult to recognize the vehicle approach in the case of the eco-car traveling by the motor.

For this reason, in the eco-car capable of traveling only by the motor, a sound generating device (also referred to as a vehicle approach notification device) notifying the surroundings that a vehicle has approached, is obligatorily provided in a vehicle, according to the country or the region. In addition, it is expected that the countries or the regions where the sound generating device will be required in the vehicle in the future will increase.

The sound generating device is set to output a sound in a determined operation condition (referred to as a vehicle approach notification sound) in a case where a vehicle travels at a vehicle speed of less than or equal to a predetermined value at which the traveling sound, a road noise, or the like decreases, and in a case where a vehicle travels in reverse. In a situation where the operation condition is satisfied, the sound generating device is required to be reliably operated, in order to ensure the safeness of the pedestrian or the like.

FIGS. 1A and 1B are exemplary diagrams describing a correspondence between the operation of the sound generating device and the pedestrian. As illustrated in FIG. 1A, in a case where an in-vehicle sound generating device is normally operated, the sound generating device outputs the vehicle approach notification sound from a speaker, and thus, a pedestrian 9 is capable of recognizing the approach of a vehicle 8. In contrast, as illustrated in FIG. 1B, in a case where the sound generating device fails, the vehicle approach notification sound is not output, and thus, it is difficult for the pedestrian 9 to recognize the approach of the vehicle 8.

In a case where a driver recognizes the failure of the sound generating device, the driver is capable of handling the failure in some way, but it is originally difficult for the driver to recognize the failure of the sound generating device. It is considered that this is because the sound generating device outputs a sound to the outside of the vehicle, the vehicle approach notification sound is not output in a case where the operation condition is not satisfied, and the like.

There is a method in which the sound generating device actually outputs an approximant, and the approximant is confirmed by being detected with a microphone, as a method of detecting the failure of the sound generating device. In addition, there is a method of measuring the impedance of the speaker, as a detection method of a failure of the speaker used for outputting the vehicle approach notification sound (for example, refer to JP 2003-274491 A).

However, in the method of actually outputting the approximant or the method of measuring the impedance of the speaker, it is not possible to detect the failure of the sound generating device in a state where the vehicle approach notification sound is not output. The operation condition is satisfied in a case where the pedestrian has already approached, but the sound generating device fails, and thus, the vehicle approach notification sound is not output, and therefore, even in a case where the failure is detected, it is difficult for the driver to handle the failure. For this reason, in the failure detection of the sound generating device, it is required that the presence or absence of the failure can be determined before the operation condition is satisfied. It is more preferable that the failure can be detected immediately after the sound generating device fails (in real time) or before the failure.

In addition, in the method of actually outputting the vehicle approach notification sound, there is a possibility of false detection as an environment sound. In the method of measuring the impedance of the speaker, there is a possibility that it is not possible to detect whether or not a sound is actually output.

SUMMARY

In consideration of the problems described above, an object of the present disclosure is to provide a failure detection device capable of detecting a failure of a sound generating device even in a state where a sound is not output.

In consideration of the problems described above, the present disclosure relates to a failure detection device configured to detect a failure of a sound generating device outputting a sound based on sound data from a speaker, the device including: an electronic watermark signal generating unit configured to generate an electronic watermark signal including collation data used for collation of whether or not a sound is output from the speaker; the speaker configured to output the electronic watermark signal as a sound; a microphone configured to collect the sound output from the speaker; a collation data detection unit configured to detect the collation data from the electronic watermark signal included in the sound collected by the microphone; and a failure determination unit configured to determine the presence or absence of the failure of the sound generating device, by collating the collation data detected by the collation data detection unit, with the collation data included in the electronic watermark signal by the electronic watermark signal generating unit.

It is possible to provide a failure detection device capable of detecting a failure of a sound generating device even in a state where a sound is not output.

BRIEF DESCRIPTION OF THE DRAWINGS

FIG. 2 is a diagram describing a mechanism at the time of detecting a failure of the sound generating device;

FIG. 13 is a diagram illustrating information that is obtained by combining failure detection according to the electronic watermark and failure detection according to impedance measurement;

FIG. 14 is a diagram describing a plurality of failure detection devices mounted on one vehicle.

DETAILED DESCRIPTION OF THE PREFERRED EMBODIMENTS

Figure 1A:
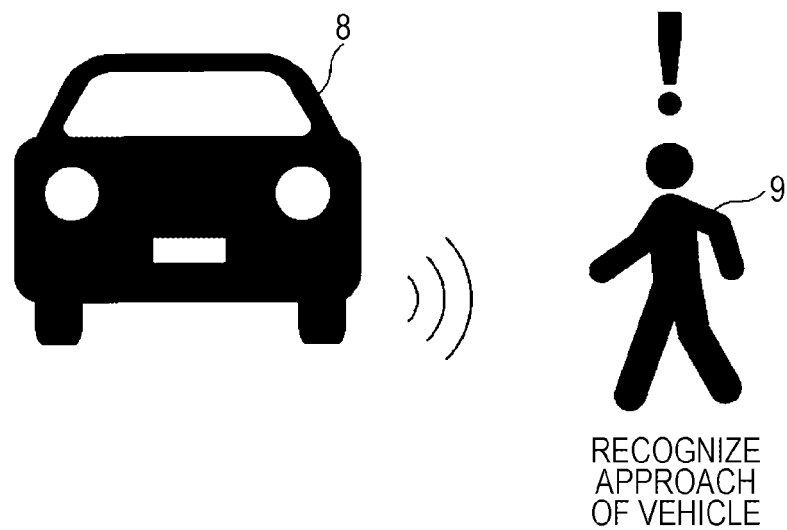
FIGS. 1A and 1B are diagrams describing a correspondence between an operation of a sound generating device and a pedestrian.
Figure 1B:
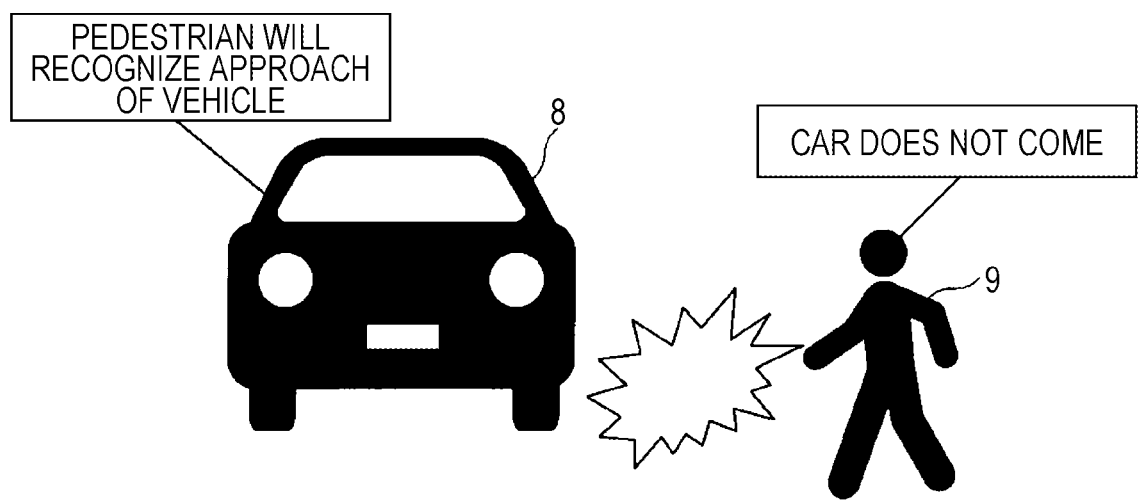

Hereinafter, a failure detection device and a failure detection method performed by the failure detection device will be described with reference to the drawings, as an example of a mode for carrying out the invention.

Example 1

<Basic Mechanism>

A basic mechanism for failure detection of a sound generating device will be described by using FIG. 2. FIG. 2 is a diagram describing a mechanism at the time of detecting a failure of the sound generating device. A failure detection device of this embodiment performs failure detection by embedding (adding) an electronic watermark with respect to an acoustic signal, and by detecting the electronic watermark.

(1) First, collation data $d1$ prepared in advance is spread with a pseudorandom number $d2$, and thus, an electronic watermark signal $d3$ is generated.

(2) The electronic watermark signal $d3$ is added to a vehicle approach notification sound $d4$, and thus, a stego-signal is generated. Furthermore, the sound volume of the electronic watermark signal is limited to be masked by the vehicle approach notification sound.

(3) A stego-signal $d5$ is subjected to DA conversion, and is output from a speaker 11.

(4) The stego-signal $d5$ output from the speaker 11, is collected by a microphone 12, and is subjected to AD conversion. The sound volume of the electronic watermark signal is limited to be masked by the vehicle approach notification sound, and thus, the stego-signal $d5$ has a waveform close to the vehicle approach notification sound $d4$, but is actually different.

(5) The failure detection device reversely spreads again the stego-signal $d5$, with the same pseudorandom number. Then, the vehicle approach notification sound is spread, and the collation data $d1$ is demodulated. Therefore, it is possible to detect a failure of the speaker 11 and the sound generating device, according to whether or not the collation data output as an electronic watermark is demodulated (it is also possible to assume a possibility that the microphone 12 fails).

In a situation where an operation condition of outputting the vehicle approach notification sound is not satisfied, it is possible to output only the collation data, and thus, it is possible to constantly detect the failure of the sound generating device. The electronic watermark signal masked by the vehicle approach notification sound is output, and thus, even when the vehicle approach notification sound is output, it is possible to detect the failure of the sound generating device. Therefore, it is possible to detect the failure of the sound generating device and the speaker 11, immediately after the sound generating device fails (in real time).

In addition, unlike the method of actually outputting the vehicle approach notification sound, it is also possible to almost eliminate the possibility of the "false detection as an environment sound". In addition, unlike the method of measuring the impedance of the speaker 11, it is possible to perform detection whether or not a sound is actually output.

Terms

The failure indicates that a normal operation is impaired. The failure also indicates that there is a difficulty in providing a function, there are some abnormalities, and the like.

The electronic watermark indicates that some information items are embedded in the digital data, or indicates the embedded information. There are two types of electronic watermarks: a perceptible watermark and a perceiving-difficult watermark. In this embodiment, the perceiving-difficult watermark is preferable, but the perceptible watermark may be used.

<System Configuration Example>

Figure 3A:
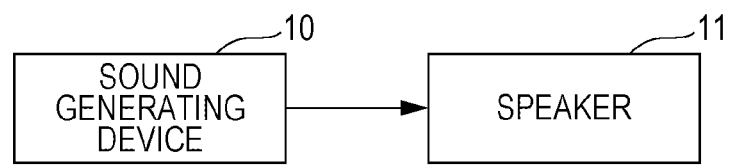
FIGS. 3A and 3B are diagrams describing a failure detection system.
Figure 3B:
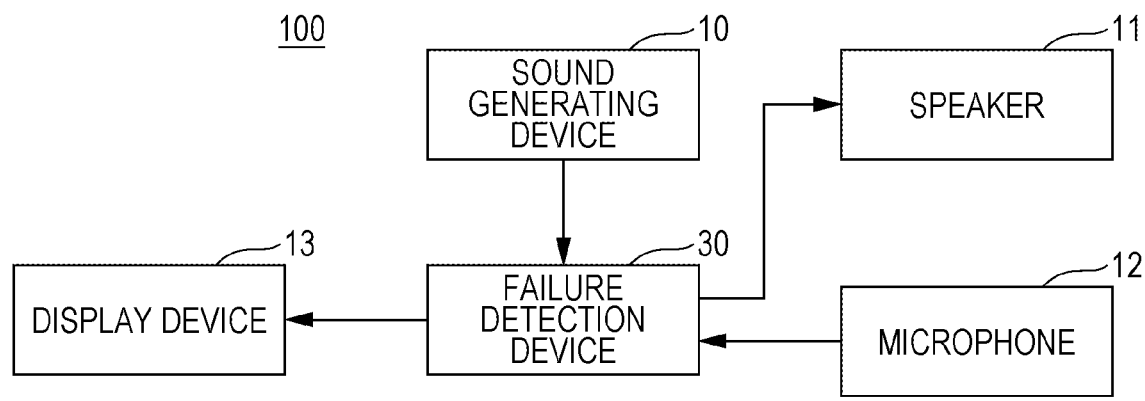

A system configuration example when the failure detection device detects the failure of the sound generating device will be described by using FIGS. 3A and 3B. FIGS. 3A and 3B are exemplary diagrams describing a failure detection system. FIG. 3A is a configuration example of a sound generating device 10 of the related art, which is illustrated for comparison. In the related art, the sound generating device 10 directly outputs the vehicle approach notification sound from the speaker 11. When the failure is detected, the impedance of the speaker 11 is measured, or the voice output from the speaker 11 is collected by a microphone.

FIG. 3B is a configuration diagram of an example of a failure detection system 100 of an embodiment of the present invention. In this embodiment, a sound generating device 10 and a failure detection device 30 are electrically connected to each other such that communication can be performed therebetween. Accordingly, the sound generating device 10 is capable of transmitting the vehicle approach notification sound to the failure detection device 30. The failure detection device 30 constantly outputs the collation data from the speaker 11. Therefore, when the vehicle approach notification sound is output, the vehicle approach notification sound is output by being embedded with the collation data (the electronic watermark signal). In a case where the vehicle approach notification sound is not output, only the collation data (the electronic watermark signal) is output. The electronic watermark is so called in the case of being embedded in host data (in this embodiment, the vehicle approach notification sound), and there is a concern that the electronic watermark is not referred to as the "electronic watermark" in a case where only the collation data is output, but in this embodiment, for the sake of the convenience of description, even in a case where only collation data is output, the electronic watermark is not referred to as the "electronic watermark" without any distinction.

Furthermore, failure detection can be performed constantly when the failure detection is required to be performed, and it is not necessary to output the collation data without any pause. For example, the output of the collation data may be stopped during parking or stopping. In addition, in a case where a battery level is less than a threshold value, the output of the collation data may be stopped. In addition, ON/OFF of the output of the collation data can be performed according to a manipulation of a driver.

The microphone 12 collects the vehicle approach notification sound embedded with the collation data (the electronic watermark signal) (together referred to as the stego-signal), or only the collation data (the electronic watermark signal), and inputs the collected sound to the failure detection device 30. The failure detection device 30 verifies the collation data, and determines the presence or absence of a failure of the sound generating device 10. In a case where it is detected that there is a failure, the failure detection device 30 displays the determination that the sound generating device 10 fails on a display device 13. The determination that there is a failure may be notified to a server through a mobile telephone network or the like. Furthermore, the display device 13 may be a meter panel, or may be a display of a navigation device. In addition, the display device 13 may be a heads up display (HUD).

The illustrated configuration is merely an example, and the failure detection device 30 may include the sound generating device 10, or the sound generating device 10 may include the failure detection device 30. For example, in a case where the navigation device has the function of the sound generating device 10, the navigation device outputs the vehicle approach notification sound and detects the failure of the sound generating device 10. In addition, a display audio or a connected audio, but not the navigation device, may function as the sound generating device 10 and the failure detection device 30. The display audio (or the connected audio) is a device mainly providing an audio visual (AV) function and a communication function, without having a navigation function.

Furthermore, the failure detection device 30 may be an information processing device, a microcomputer, a control device, or the like, including a CPU, a RAM, a flash memory, an input and output I/F, and the like. The failure detection device 30 realizes the following functions or units by executing a program decompressed to the RAM from the flash memory, with the CPU.

<Processing Flow>

Figure 4:
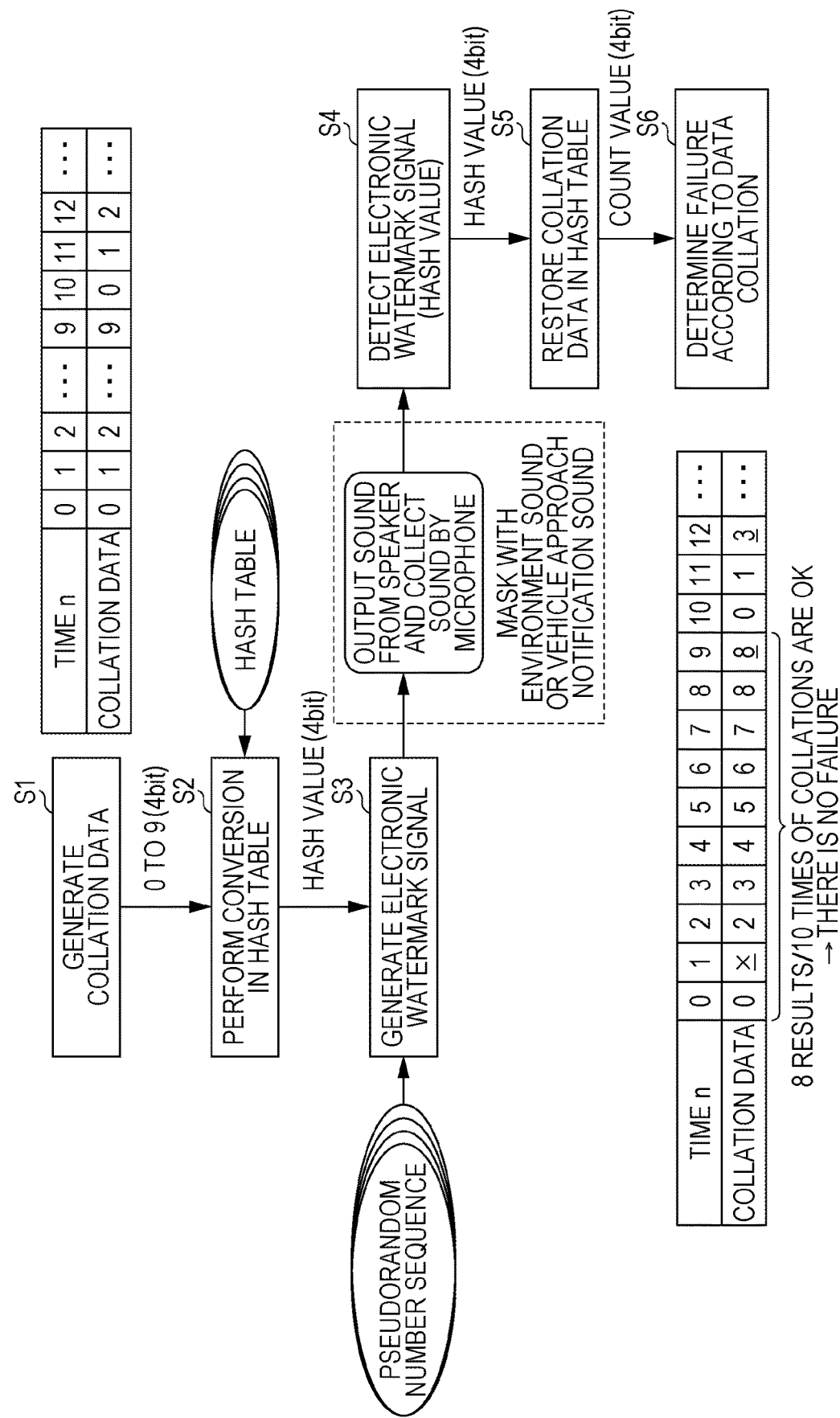
FIG. 4 is a diagram describing the overall flow when a failure detection device detects a failure.

A processing flow when the failure detection device 30 detects the failure of the sound generating device 10 will be described by using FIG. 4. FIG. 4 is a diagram describing the overall flow when the failure detection device 30 detects a failure.

S1

The failure detection device 30 generates the collation data. The collation data embedded in the vehicle approach notification sound is data having consecutiveness in chronological order. In the example of FIG. 4, the collation data is a numerical value counted up one by one, such as "0, 1, 2, 3, 4, 5, 6, 7, 8, and 9". The numerical number returns to "0" after "9". The collation data is the data generated on the basis of such a rule, and thus, when the failure detection device 30 collates the collation data, it is not possible to specify the collation data output from the speaker.

It is natural that the numerical value such as 0 to 9, is an example. The collation can be performed with any numerical value, and may be performed with an alphabet (a character) or a symbol in addition to the numerical value. However, it is preferable that a bit number of the collation data is short. This is because 1 bit is multiplexed as described below in order to improve a detection accuracy of data at the time of demodulation, and thus, in a case where the bit number of the original collation data is short, a signal length of the collation data after multiplexing is short. That is, it is possible to embed the collation data for a short time, and it is also possible to perform the detection for a short time. Furthermore, a bit number necessary for 0 to 9 is 4 bits.

S2

The failure detection device 30 converts the collation data into a hash value in a hash table (an example of the collation data after conversion). This is because in a case where the same failure detection device 30 exists in the surroundings, it is assumed that the electronic watermark signal of the failure detection device 30 is input as an environment sound. In a case where the nearby failure detection device 30 outputs the same numerical value at the same timing, there is a concern that the other failure detection device 30 performs false detection with respect to the output numerical value. In order to prevent such false detection, the collation data is converted into the hash value in the hash table. The consecutive numerical values in chronological order are randomly changed according to the hash table, and thus, it is possible to reduce a possibility that the same numerical value is output at the same timing.

In a case where the nearby failure detection device 30 uses the same hash table, the hash values after the conversion become the same, and thus, a plurality of hash tables are prepared, and the failure detection device 30 switches the hash table at random, at the time of activating a vehicle system (corresponding to ignition ON of a vehicle traveling by an internal combustion). Accordingly, it is possible to reduce a possibility that an electronic watermark signal output by the failure detection device 30 of the other vehicle 8 is subjected to the false detection.

S3

The failure detection device 30 generates the electronic watermark signal by multiplying the collation data and the pseudorandom number together. Furthermore, when the vehicle approach notification sound is output, the vehicle approach notification sound with the collation data in which the electronic watermark signal is embedded in the vehicle approach notification sound (the electronic watermark signal) (the stego-signal), is generated. The size (the sound volume) of the electronic watermark signal is limited to be masked by the vehicle approach notification sound or the environment sound. It is sufficient that the pseudorandom number is capable of spreading the collation data, and the pseudorandom number will be referred to as an M-sequence in spread codes. A spread code such as a PN-sequence and a Gold-sequence may be used in addition to the M-sequence.

In a case where the same failure detection device 30 exists in the surroundings, and the same pseudorandom number is used, the nearby failure detection device 30 demodulates the output electronic watermark signal. In this case, the hash table used by the nearby failure detection device 30 is assumed to be different, and the output collation data and the restored collation data are different from each other, and thus, there is a concern that the failure detection device 30 does not fail, but is falsely detected as failing. Therefore, the failure detection device 30 switches the pseudorandom number at random, at the time of activating the system. Accordingly, even in a case where the same failure detection device 30 exists in the surroundings, it is not possible to demodulate the electronic watermark signal output by the nearby failure detection device 30, and it is possible to reduce a concern that the failure detection device 30 does not fail, but is falsely detected as failing.

S4

The failure detection device 30 collects the vehicle approach notification sound with the collation data (the electronic watermark signal), or only the collation data (the electronic watermark signal), with the microphone 12, and detects the hash value by multiplying the collected sound and the pseudorandom number together, as described above.

S5

The failure detection device 30 restores the collation data from the hash value, by using the hash table at the time of converting the collation data into the hash value.

S6

The failure detection device 30 verifies whether or not the collation data output as the electronic watermark is detected, and thus, performs the failure determination. A case where a part of the collation data of 0 to 9 is dropped without being detected due to the environment sound or the like, or a case where a part of the collation data of 0 to 9 is falsely detected as another value is considered, and thus, the presence or absence of a failure is comprehensively determined at an accuracy rate of the collation data of a constant number. For example, in the example of FIG. 4, in the numerical values of time 0 to time 9, the collation data is not correctly detected at the first time and the ninth time, but the collation data is correctly detected in the remaining 8 times. Thus, in a case where the accuracy rate is greater than or equal to a threshold value, it is possible to determine that there is no failure. Furthermore, in failure determination, in a case where the collation data is not capable of being correctly detected consecutive N times, it may be determined that there is a failure.

<Output and Detection of Electronic Watermark Signal>

Figure 5:
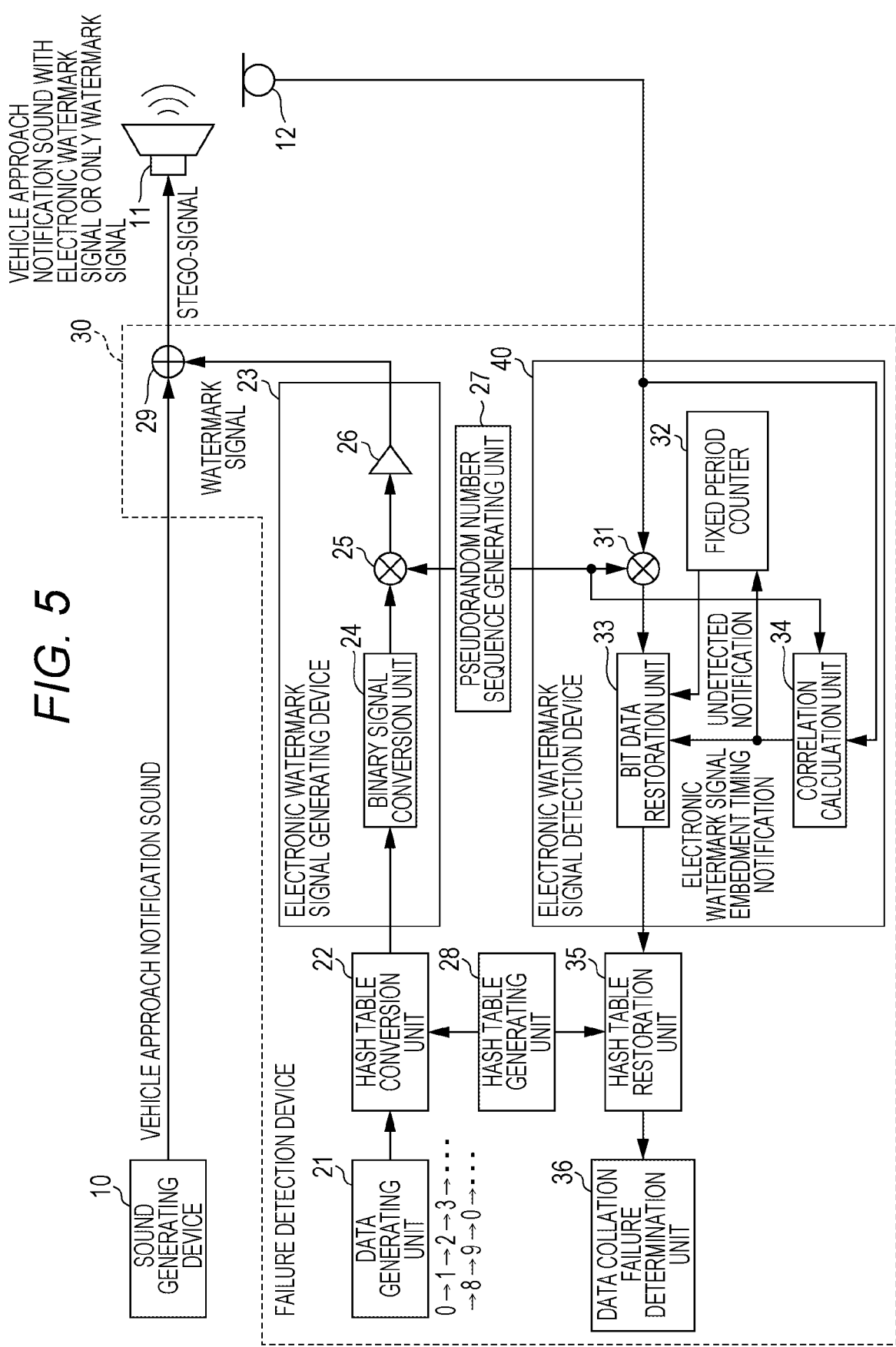
FIG. 5 is a functional block diagram illustrating the function of the failure detection device in a block.

The output and the detection of the electronic watermark signal will be described in detail by using FIG. 5. FIG. 5 illustrates a functional block diagram of the function of the failure detection device 30. In addition, FIG. 5 illustrates a flow among each function of the failure detection device 30 as it outputs and detects the electronic watermark signal.

A data generating unit 21 generates the collation data of 0 to 9, in order. A time for retaining one numerical value is determined in advance, according to a bit rate [bps] of the electronic watermark signal.

A hash table generating unit 28 generates the hash table that converts 0 to 9 into the hash value of 4 bits, at random, at the time of activating the system, or the like. Examples of the hash table are shown in Table 1. The collation data converted by a certain hash table is not capable of being restored unless the hash tables are the same, and thus, it is possible to reduce a concern that the electronic watermark signal output by another failure detection device 30 is restored.

TABLE 1

| Numerical Value | Hash Value |
|---|---|
| 0 | 1110 |
| 1 | 0010 |
| 2 | 0101 |
| 3 | 1001 |
| 4 | 0111 |
| 5 | 0000 |
| 6 | 1000 |
| 7 | 0101 |
| 8 | 1100 |
| 9 | 0100 |

Table 1 shows an example of a hash table. As shown in the hash table, the numerical value of 0 to 9 is converted into a hash value of 4 bits without overlapping.

A hash table conversion unit 22 converts the collation data into the hash value using the hash table generated by the hash table generating unit 28. The hash value is input into an electronic watermark signal generating device 23.

The electronic watermark signal generating device 23 includes a binary signal conversion unit 24, a spread unit 25, and a gain adjustment unit 26. The binary signal conversion unit 24 multiplexes 1 bit of the hash value into 8 bits, and replaces "0" with "−1". Therefore, a binary signal of 32 bits is obtained.

Figure 6:
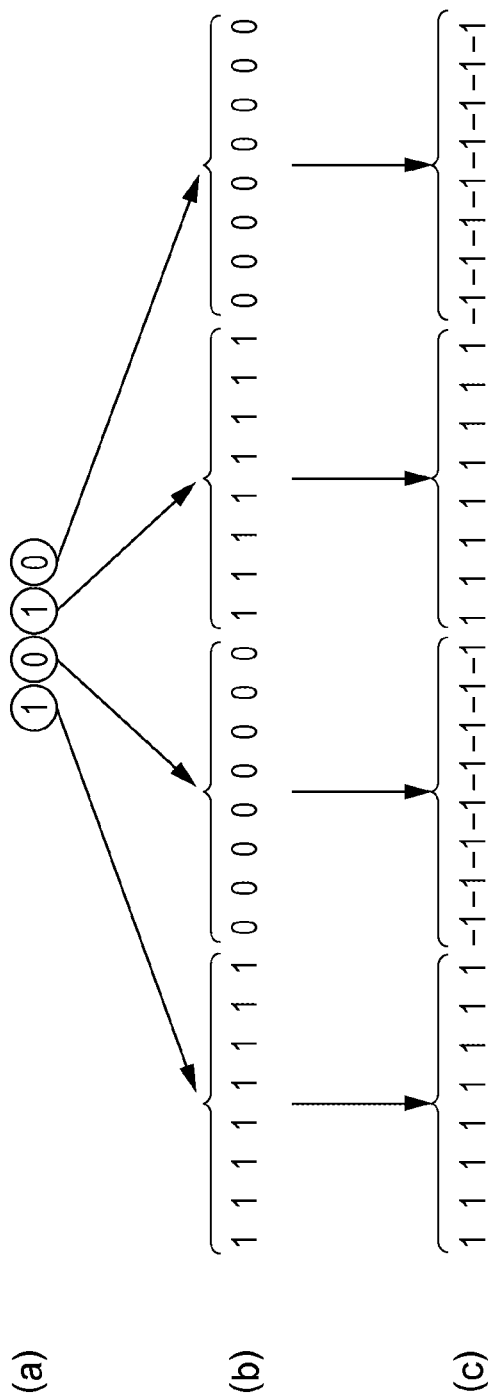
FIG. 6 is a diagram describing the processing of a binary signal conversion unit.

FIG. 6 is an example of a diagram describing the processing of the binary signal conversion unit 24. FIG. 6(a) illustrates the hash value. The binary signal conversion unit 24 multiplexes the hash value into 8 bits. FIG. 6(b) illustrates the multiplexed hash value. To which bit the hash value is multiplexed is determined to be an S/N ratio at which the electronic watermark signal can be detected. Therefore, the hash value may be multiplexed into any bit other than 8 bits. In general, it is more advantageous to detect the electronic watermark signal as a bit number of the multiplex increases. This is because the total (more specifically, the average) of the electronic watermark signals for a time of being multiplexed is used at the time of detecting the electronic watermark signal.

Next, the binary signal conversion unit 24 replaces "0" with "−1". "1" may be left as it is. FIG. 6(c) illustrates the hash value after the multiplexing in which "0" is replaced with "−1". "1" is left as it is, and "0" is replaced with "−1", and thus, in a case where the pseudorandom number is multiplied twice (spread and reverse spread), the original hash value is obtained.

Returning to FIG. 5, the spread unit 25 spreads the hash value that is converted by the binary signal conversion unit 24 with the pseudorandom number generated by a pseudorandom number sequence generating unit 27. Specifically, the pseudorandom number and the hash value are multiplied together. The hash value of 4 bits is multiplexed into 8 bits each to be 32 bits, but the pseudorandom number spreads 1 bit, and thus, the length of the pseudorandom number is a digit number (also referred to as a chip) capable of sufficiently spreading 1 bit.

Figure 7:
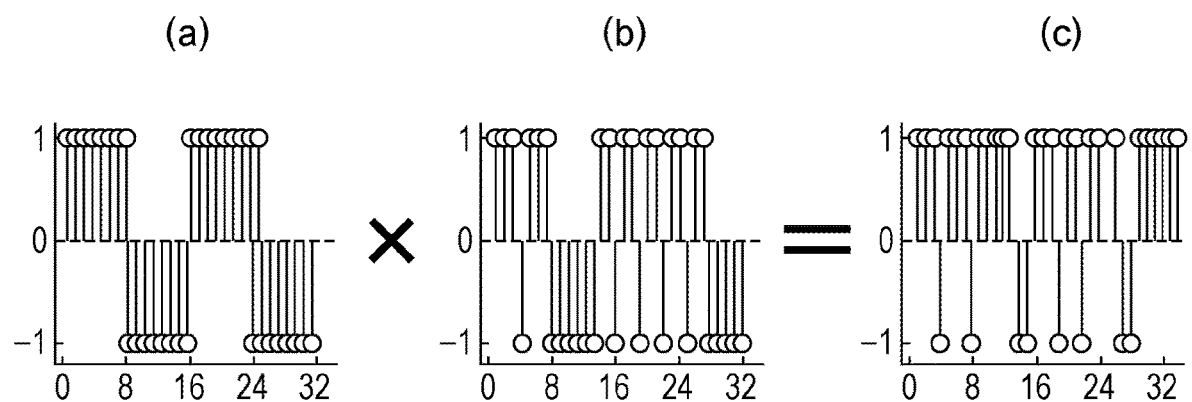
FIG. 7 is a diagram describing spread with a pseudorandom number.

FIG. 7 is an exemplary diagram describing the spread according to the pseudorandom number. FIG. 7(a) illustrates the hash value after the multiplexing in which "0" is replaced with "−1", FIG. 7(b) illustrates an example of the pseudorandom number, and FIG. 7(c) illustrates the electronic watermark signal. As illustrated in FIG. 7(c), the original signal (the hash value) is spread with the pseudorandom number.

Returning to FIG. 5, the gain adjustment unit 26 decreases the sound volume of the electronic watermark signal to be masked by the vehicle approach notification sound or the environment sound. In the case of being represented by a gain [dB], the electronic watermark signal decreases with a gain of a negative value. How the sound volume is adjusted at the time of being output from the speaker 11 may be experimentally determined. For example, in a case where the vehicle approach notification sound is a signal of 65536 gradations (16 bits), the maximum sound volume corresponds to 65536. In such sound volume, the sound volume of the electronic watermark signal is adjusted to be detected after being collected by the microphone 12 and to be masked. For example, in a case where "1" of the electronic watermark signal corresponds to 65536, the sound volume decreases such that the electronic watermark signal decreases from a few hundredth to a few thousandth. The electronic watermark signal may be masked, the sound volume of the electronic watermark may be less than that of the vehicle approach notification sound, or the vehicle approach notification sound may increase. The same applies to the environment sound, and the details will be described below.

Next, an addition unit 29 adds the electronic watermark signal to the vehicle approach notification sound. Such addition processing may be referred to as "embedment". In a case where the vehicle approach notification sound is not output, the addition unit 29 transmits only the electronic watermark signal to the speaker 11 without performing the addition.

Figure 8:
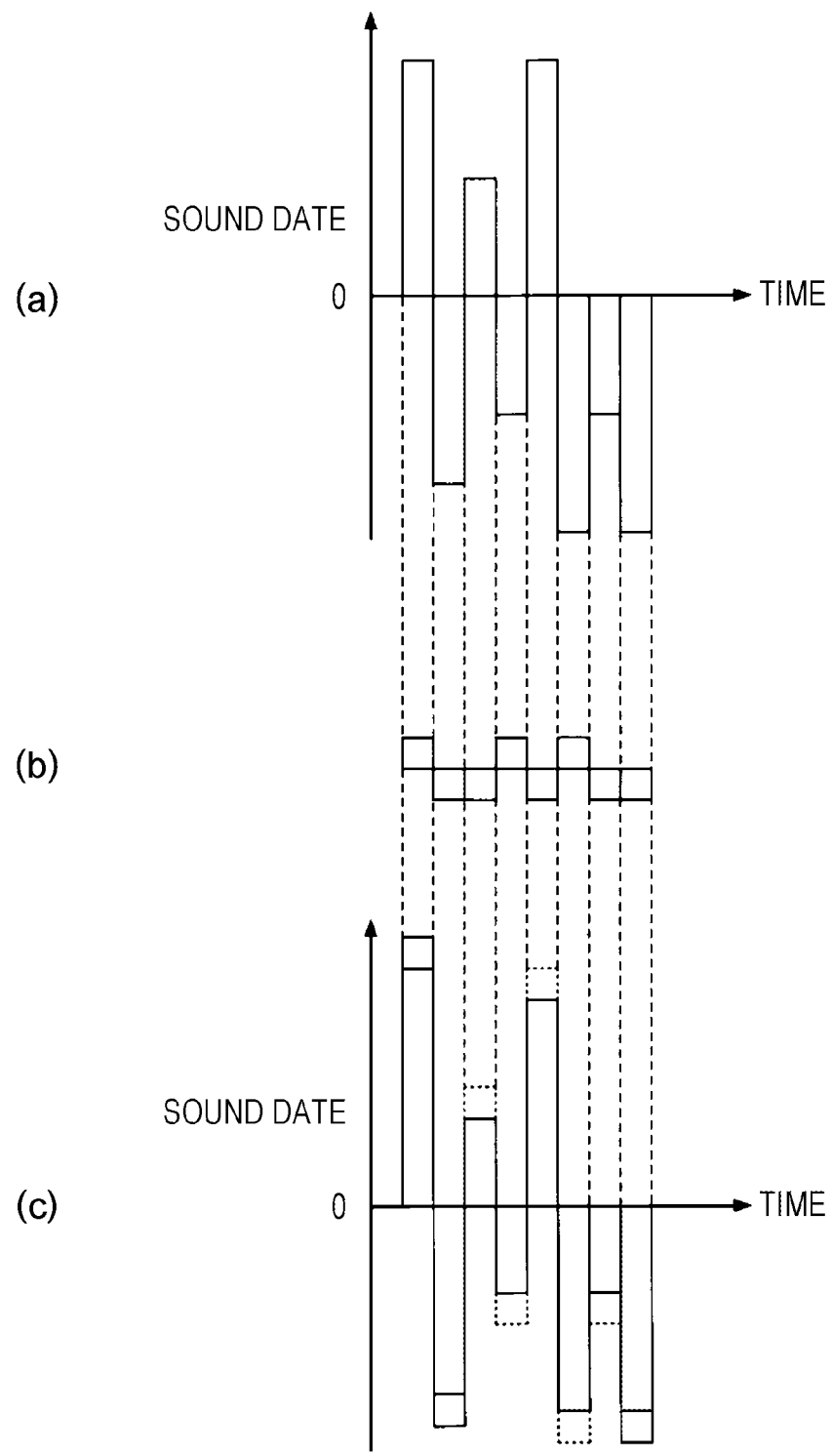
FIG. 8 is a diagram schematically illustrating the addition of an electronic watermark signal to a vehicle approach notification sound.

FIG. 8 is an exemplary diagram schematically illustrating the addition of the electronic watermark signal to the vehicle approach notification sound. FIG. 8(a) illustrates the waveform of the vehicle approach notification sound (digital), FIG. 8(b) illustrates an example of the electronic watermark (digital) to be embedded, and FIG. 8(c) illustrates an example of the stego-signal in which the vehicle approach notification sound and the electronic watermark signal are added.

In FIG. 8, the sound volume of the electronic watermark signal is adjusted in advance with respect to the sound volume of the vehicle approach notification sound. In a case where the electronic watermark signal is +1, the vehicle approach notification sound increases by +1, and in a case where the electronic watermark signal is −1, the vehicle approach notification sound decreases by +1. The electronic watermark signal of 8 bits×4=32 bits is subjected to such addition processing.

When the sound data is output from the speaker as a sound, the sound data is represented by a bit sequence of 1 and 0, on the basis of a bit depth (for example, 8 bits, 16 bits, 24 bits, and the like), and is output from the speaker on the basis of a bit rate [bps] of the vehicle approach notification sound. Therefore, a time required for outputting the electronic watermark signal of 32 bits is changed according to the bit rate, and thus, as described above, the data generating unit 21 generates the collation data of 0 to 9 at a timing according to the bit rate.

Figure 9:
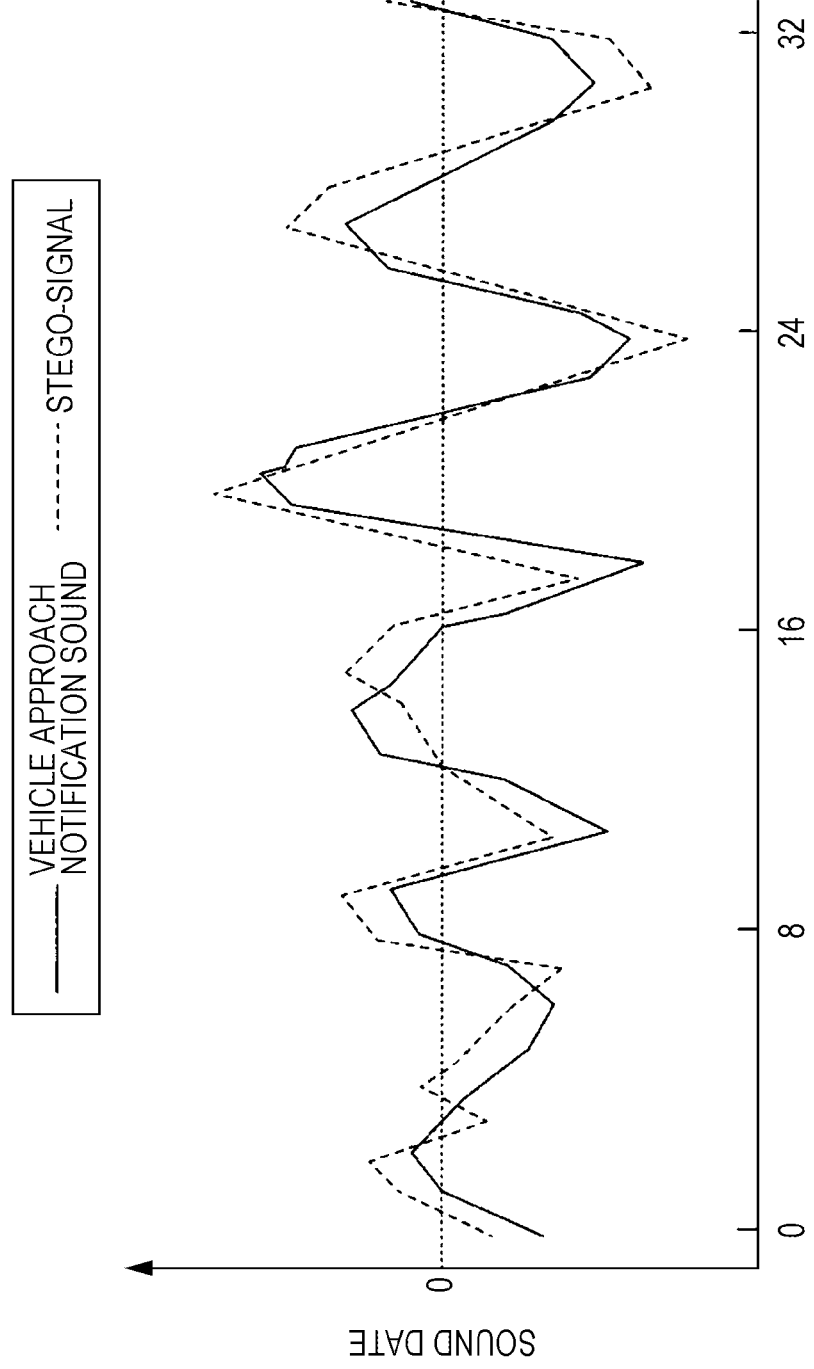
FIG. 9 is a diagram illustrating an example of a stego-signal to which the vehicle approach notification sound and the electronic watermark signal are added.

In order to describe the detection of the electronic watermark signal, a graph of another stego-signal is illustrated in FIG. 9. FIG. 9 illustrates an example of the stego-signal in which the vehicle approach notification sound and the electronic watermark signal are added. In FIG. 9, a solid line represents the vehicle approach notification sound, and a dotted line represents the stego-signal. Furthermore, a horizontal axis is a sampling time, and a vertical axis is an amplitude of the sound volume. The vehicle approach notification sound is slightly different from the stego-signal due to the electronic watermark.

Returning to FIG. 5, the vehicle approach notification sound with an electronic watermark (the stego-signal) or the electronic watermark signal alone is sound data for vibrating the speaker 11. The sound data is subjected to DA conversion when the signal is transmitted to the speaker 11 from the addition unit 29. The speaker 11 may perform DA conversion with respect to the vehicle approach notification sound with an electronic watermark (the stego-signal) or the electronic watermark signal, and outputs a sound including the DA-converted sound or signal.

Next, the microphone 12 collects the vehicle approach notification sound with an electronic watermark (the stego-signal) or the electronic watermark signal alone. The vehicle approach notification sound with an electronic watermark (the stego-signal) or the electronic watermark signal is subjected to AD conversion to be a digital signal and is input into an electronic watermark signal detection device 40.

The electronic watermark signal detection device 40 includes a reverse spread unit 31, a fixed period counter 32, a bit data restoration unit 33, and a correlation calculation unit 34.

First, the reverse spread unit 31 reversely spreads the vehicle approach notification sound with an electronic watermark (the stego-signal) or the electronic watermark signal, with the pseudorandom number. The reverse spread and the spread have the same arithmetic contents. In the spread, a portion multiplied by 1 is left as 1, and a portion multiplied by −1 is returned to 1. On the other hand, in the stego-signal, the vehicle approach notification sound is spread, and thus, is regarded as a noise. Therefore, it is possible to restore the electronic watermark signal, and to eliminate the vehicle approach notification sound.

Figure 10:
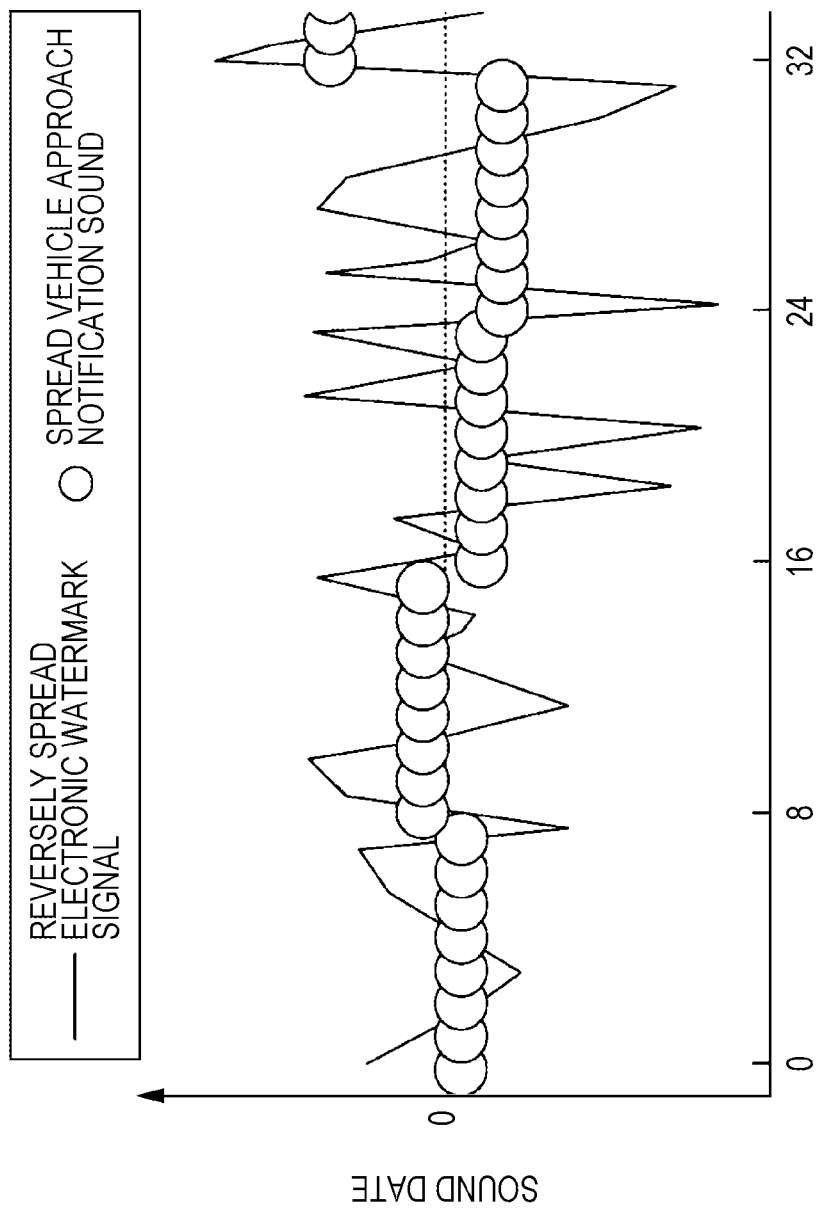
FIG. 10 is a diagram illustrating the vehicle approach notification sound with an electronic watermark (the stego-signal), which is reversely spread.

FIG. 10 illustrates an exemplary diagram illustrating the vehicle approach notification sound with an electronic watermark (the stego-signal) which is reversely spread. In FIG. 10, a solid line represents the reversely spread electronic watermark signal, and consecutive "○" represents the spread vehicle approach notification sound. The electronic watermark signal is multiplied by the pseudorandom number twice at the time of the spread and the reverse spread, and thus, is restored to the multiplexed hash value.

The correlation calculation unit 34 performs correlation calculation with respect to the stego-signal and a pseudorandom number signal to be sequentially input while shifting one sampling period, according to a mutual correlation function as the following expression. X(t) is the pseudorandom number signal, and Y(t+τ) is the stego-signal.

$$Cxy = \Sigma X(t)Y(t+\tau)$$

Therefore, the correlation calculation unit 34 performs the same calculation as that of the reverse spread unit 31, and adds each multiplication result. According to the correlation calculation, a timing when the pseudorandom number and the stego-signal are synchronized, appears. The timing is identical to the length of the pseudorandom number, but the result of the correlation calculation represents a peak at a synchronization timing (becomes almost zero due to the properties of the pseudorandom number unless the synchronization is performed). Therefore, it is possible to detect that the synchronization with the electronic watermark signal is obtained, according to the peak. Furthermore, specifically, in a case where Cxy is greater than or equal to a threshold value, it is determined that the synchronization is obtained. When the synchronization is obtained, the correlation calculation unit 34 transmits timing notification to the fixed period counter 32 and the bit data restoration unit 33.

The bit data restoration unit 33 restores the bit data by 8 bits that is a multiplex number, triggered by the timing notification. The multiplexed hash value is obtained by the reverse spread, but the value of the data collected by the microphone 12 is not "+1" or "−1". However, the portion corresponding to "+1" is definitely a positive value, and the portion corresponding to "−1" is definitely a negative value. Therefore, the bit data restoration unit 33 obtains the average of the amplitudes at every 8 bits, restores "+1" in the case of a positive value, and restores "0" in the case of a negative value. Accordingly, the hash value before the multiplexing is obtained. The bit data restoration unit 33 transmits the restored hash value before the multiplexing to a hash table restoration unit 35.

On the other hand, fixed period counter 32 performs a count for a constant period (8 bits×4 bits), triggered by the timing notification. In a case where there is no next timing notification within a time limit (for example, Time+a for counting 32 bits), it is determined as being undetected. The fixed period counter 32 transmits undetected notification to the bit data restoration unit 33. This is because the case of being undetected indicates a case where the electronic watermark signal is not capable of being detected due to the environment sound or the like, and thus, the bit data is not capable of being correctly restored. According to the undetected notification, the bit data restoration unit 33 is capable of ending the restoration of the bit data.

The hash table restoration unit 35 searches the hash value from the hash tables generated by the hash table generating unit 28, and specifies the collation data associated with the hash value. Accordingly, the collation data converted into the electronic watermark signal is obtained.

A data collation failure determination unit 36 determines whether or not the collation data transmitted as the electronic watermark signal is coincident with the collation data specified with the hash table. In a case where the accuracy rate is not less than or equal to the threshold value, or the collation data transmitted as the electronic watermark signal is not coincident with the collation data specified with the hash table, consecutively N times, it is determined that any one of the sound generating device 10, the speaker 11, and the microphone 12 failed.

<Gain Adjustment of Gain Adjustment Unit>

It is preferable that the gain adjustment unit 26 changes an adjustment amount of the gain in a case where the vehicle approach notification sound is output and in a case where the vehicle approach notification sound is not output. This is because in a case where the vehicle approach notification sound is not output, the electronic watermark signal is masked by the environment sound, but the vehicle approach notification sound and the environment sound do not necessarily have the same sound volume. Originally, the environment sound is not constant. In addition, it is preferable that the electronic watermark signal is output with a maximum sound volume that a pedestrian 9 is not capable of hearing, such that the restoration is easily performed.

Figure 11:
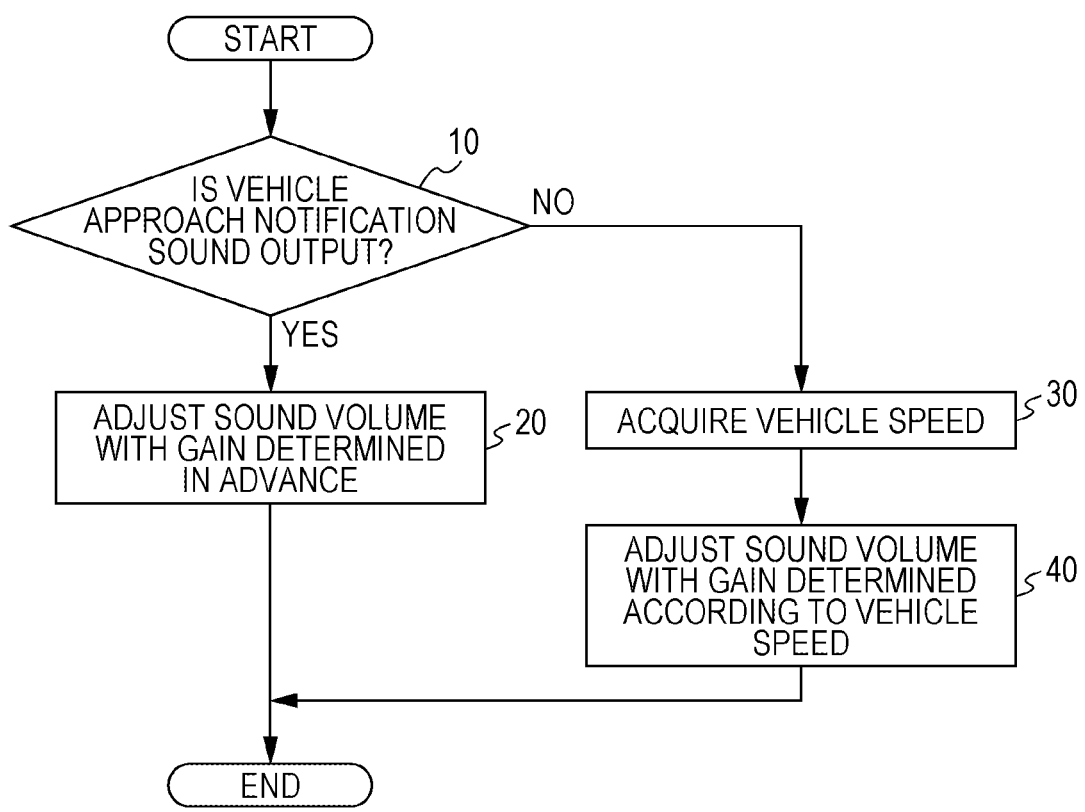
FIG. 11 is a flowchart illustrating the procedure of gain adjustment.

Therefore, the gain adjustment unit 26 adjusts the gain as follows. FIG. 11 is an exemplary flowchart illustrating the procedure of gain adjustment. The processing of FIG. 11, for example, is periodically executed while the electronic watermark signal is output.

The gain adjustment unit 26 determines whether or not the vehicle approach notification sound is output (S10). For example, whether or not the vehicle approach notification sound is input into the failure detection device 30 from the sound generating device 10, is determined. The gain adjustment unit 26 may inquire of the sound generating device 10, or the gain adjustment unit 26 may determine whether or not the operation condition of the sound generating device 10 is satisfied.

In a case where the determination of Step S10 is Yes, the gain adjustment unit 26 adjusts the sound volume of the electronic watermark signal with the gain determined in advance (S20). The sound volume of the vehicle approach notification sound, for example, is reduced from a few hundredth to a few thousandth. Furthermore, in a case where the gain is represented by [dB], the gain is a negative value.

In a case where the determination of Step S10 is No, the gain adjustment unit 26 acquires the speed of a mobile object (in the case of a vehicle, a vehicle speed) (S30). This is because the vehicle speed readily affects the environment sound.

The gain adjustment unit 26 adjusts the sound volume with the gain determined according to the vehicle speed (S40). The sound volume of the electronic watermark signal may increase as the vehicle speed increases. Similarly, the sound volume of the electronic watermark signal may decrease as the vehicle speed decreases. Furthermore, in general, the sound volume of the vehicle approach notification sound is greater than the sound volume of the environment sound, and thus, in a case where the vehicle approach notification sound is not output, the sound volume of the electronic watermark signal decreases, compared to the case in which the vehicle approach notification sound is output.

Thus, it is possible to operate whether or not the vehicle approach notification sound is output, and to adjust the electronic watermark signal to have the optimal sound volume with respect to the environment sound.

Furthermore, the gain may not be determined according to the vehicle speed, but the sound volume of the environment sound may be actually acquired by the microphone 12, and the sound volume of the electronic watermark signal may be reduced on the basis of the sound volume.

<Conclusion>

As described above, in the failure detection device 30 of this embodiment, the collation data can be output by being masked by the vehicle approach notification sound or the environment sound, and thus, even when the vehicle approach notification sound is not output, it is possible to detect the failure of the sound generating device 10. For example, it is possible to detect the failure immediately after the sound generating device 10 fails.

In addition, unlike the method of actually outputting the vehicle approach notification sound, it is possible to almost eliminate the possibility of the "false detection as an environment sound". Moreover, unlike the method of measuring the impedance of the speaker 11, it is possible to perform detection whether or not a sound is actually output.

Example 2

In this example, the failure detection device 30 detecting the failure of the sound generating device 10, in conjunction with impedance measurement, will be described. The electronic watermark is originally performed in the state of a poor S/N ratio, and thus, tends to be difficult to retain a detection accuracy. In this example, the impedance measurement and the failure detection device 30 of Example 1 are combined, and thus, it is possible to more reliably detect a failure.

As described in Example 1, the failure detection device 30 outputs the electronic watermark signal and the speaker 11 is constantly in a driving state, and therefore, it is possible to constantly perform the failure detection according to the impedance measurement. In addition, a failure detection result according to the electronic watermark and a failure detection result according to the impedance measurement are combined, and thus, a fault can be identified, and the failure detection device 30 and an impedance measurement device are capable of monitoring each other.

Figure 12:
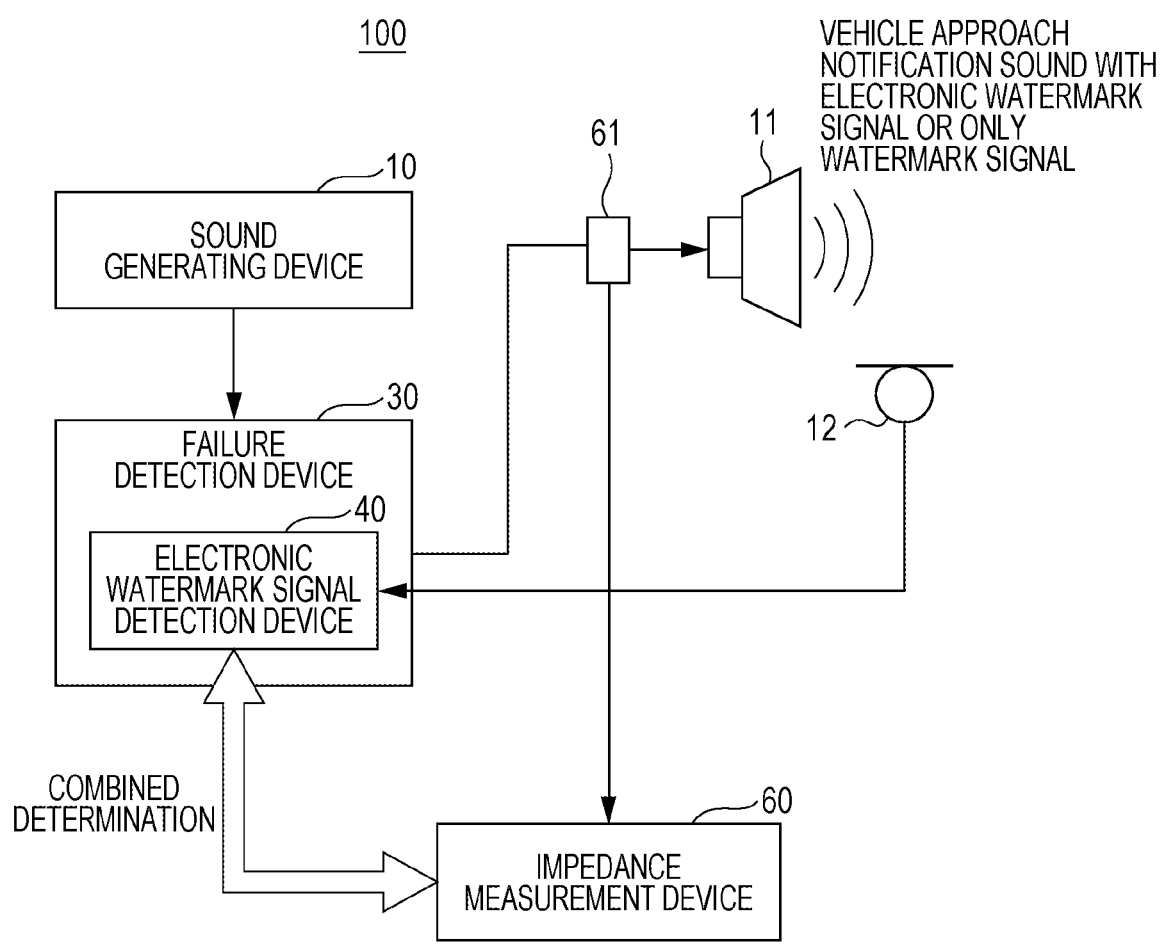
FIG. 12 is a configuration diagram of an example of the failure detection system (Example 2)

FIG. 12 illustrates a configuration diagram of an exemplary failure detection system 100. The configuration of the failure detection device 30 is identical to that of Example 1. In FIG. 12, an impedance measurement device 60 is connected to the speaker 11, and a detection circuit 61 measures the impedance of the speaker 11 from a current and a voltage flowing into the speaker 11. In a case where the inside of the speaker 11 is disconnected, a current does not flow into the speaker 11, and thus, it is possible to detect the disconnection by comparing a threshold value with the impedance. Furthermore, it is sufficient that the detection circuit 61 of this embodiment is configured to measure the impedance. For example, a specified alternating-current voltage is applied to the sound generating device 10 and the speaker 11, and the current flowing into the speaker 11 is detected, and thus, the impedance measurement device 60 is capable of calculating the impedance.

Furthermore, a resistance value with respect to a direct current may be detected, instead of the impedance, and the disconnection may be detected on the basis of the resistance value.

In addition, the configuration of FIG. 12 is merely an example, and the failure detection device 30 may include the impedance measurement device 60. The failure detection device 30 may acquire a determination result of the presence or absence of a failure from the impedance measurement device 60.

<Effect of Combination of Failure Detection According to Electronic Watermark and Failure Detection According to Impedance Measurement>

FIG. 13 illustrates information that is obtained by combining the failure detection according to the electronic watermark and the failure detection according to the impedance measurement. Furthermore, hereinafter, OK indicates that there is no failure detection, and NG indicates that there is failure detection.

(i) Electronic Watermark Determination=OK, Impedance Measurement=OK

There is no failure in the sound generating device 10, the failure detection device 30, the impedance measurement device 60, the speaker 11, and the microphone 12. That is, there is no abnormality in the failure detection system 100.

(ii) Electronic Watermark Determination=OK, Impedance Measurement=NG

There is a failure in the impedance measurement device 60 (actually, the speaker 11 is not disconnected), or there is a false detection of the electronic watermark signal of another vehicle (the speaker 11 fails, but the electronic watermark signal of another vehicle is acquired by the microphone 12).

(iii) Electronic Watermark Determination=NG, Impedance Measurement=OK

There is a failure in the failure detection device 30 (the sound generating device 10 and the speaker 11 are normal, but the failure detection device 30 fails), or there is a failure in the microphone 12 (the sound generating device 10 and the failure detection device 30 are normal, but the microphone 12 fails).

(iv) Electronic Watermark Determination=NG, Impedance Measurement=NG

One or more of the sound generating device 10, the failure detection device 30, the impedance measurement device 60, the speaker 11, and the microphone 12 definitely fail. That is, it is obvious that the failure detection system 100 is not capable of being used.

As described above, the electronic watermark and the impedance measurement are combined, and thus, a fault is easily specified. In addition, in the combination of the electronic watermark determination and the impedance measurement, as in (ii), the failure of the impedance measurement device 60 is detected, and in the combination, as in (iii), the failure of the failure detection device 30 is detected, and thus, the impedance measurement device 60 and the failure detection device 30 are capable of monitoring each other for the presence or absence of a failure. In general, in a device detecting a failure of other devices, a mechanism for detecting a failure of the device is required, but in this example, the impedance measurement device 60 monitors the sound generating device 10 and the failure detection device 30, and the failure detection device 30 monitors the sound generating device 10 and the impedance measurement device 60, and thus, another device for detecting the failure of the failure detection device 30 and the impedance measurement device 60 is not necessary.

Example 3

In this example, a case where a plurality of sound generating devices 10 are mounted on the vehicle 8, will be described. For example, there is also a case where the vehicle approach notification sound is not capable of reaching the assumed area due to a large body size, and thus, the plurality of sound generating devices 10 are mounted on one vehicle 8. The sound generating device 10 of Example 1 generates the hash table or the pseudorandom number at random, and thus, a plurality of failure detection devices 30 can be mounted on one vehicle 8.

FIG. 14 is an exemplary diagram describing the plurality of failure detection devices 30 mounted on one vehicle 8. In this case, the plurality of failure detection devices 30 may be independently subjected to the failure detection, according to a combination of the hash table and a pseudorandom number sequence. However, the combination of the hash table and the pseudorandom number sequence is limited, and thus, it is preferable to use the collation data on which the electronic watermark signal is based] by shifting the collation data. In FIG. 14, the numerical value of 0 to 9 of the collation data is shifted by one value with respect to time, but it is sufficient that the collation data does not have the same numerical value.

Accordingly, it is sufficient that the combination of the hash table and the pseudorandom number sequence is "generated at random with respect to a system activation timing", and even in a case where the hash table and the pseudorandom number sequence are limited, the vehicle 8 is characterized by the hash table and the pseudorandom number sequence, and thus, it is possible to suppress false detection due to the electronic watermark signal of another vehicle.

Example 4

In Examples 1 to 3, an example in which the failure detection device 30 is mounted on the vehicle 8 has been described, but the failure detection device 30 of this embodiment can be applied to a device using the speaker 11. For example, the failure detection device 30 of this embodiment can be preferably applied to a device that is used only occasionally but is disadvantageous in a case where the device fails at the time of being used.

Figure 15C:
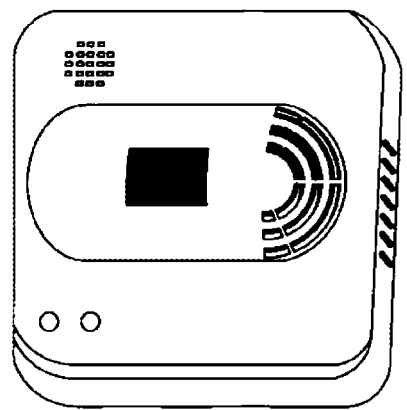
FIGS. 15A to 15C are examples of external views of several devices using a speaker.
Figure 15B:
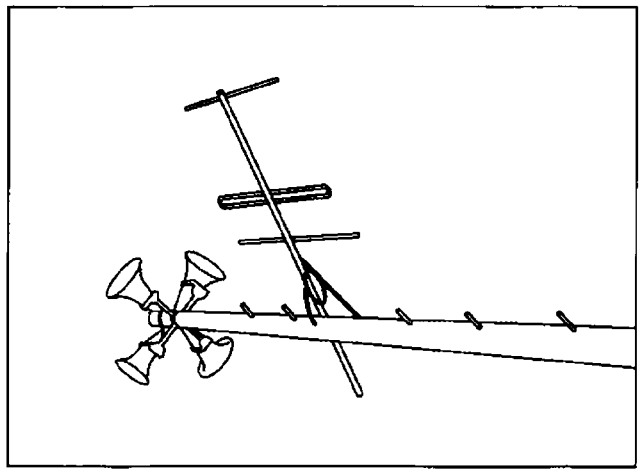
Figure 15A:
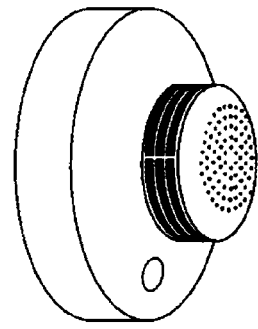

Speaker Type Alarm (Fire Alarm and Gas Leakage Alarm)
Disaster Prevention Administration Wireless Broadcast Speaker
Security Warning Device FIGS. 15A to 15C are external views of several devices using the speaker 11. FIG. 15A illustrates a fire alarm, FIG. 15B illustrates a disaster prevention administration wireless broadcast speaker, and FIG. 15C illustrates a gas alarm, respectively. The application is not limited thereto, but the failure detection device 30 of this embodiment can be widely applied to the speaker 11 in the train, a disaster prevention speaker in the building, and the like.

In addition, the failure detection device 30 of Examples 1 to 3 can also be provided in a mobile object other than the vehicle 8. For example, the failure detection device 30 of Examples 1 to 3 can also be applied to a two-wheel vehicle, a wheelchair, a light vehicle, a one- or two-seater mobility, a robot, or the like, in addition to the vehicle 8 (including a motorcycle). The failure detection device 30 mounted on such a mobile object is a device mounted with a mobile object. For example, examples of the device mounted with a mobile object include an in-vehicle device or a navigation device. In a case where the failure detection device 30 is mounted on a mobile object other than the vehicle, the vehicle approach notification sound may be referred to as a name suitable for each mounting device.

Other Application Examples

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

For example, the configuration example of FIG. 5 is divided according to a main function, in order to facilitate the understanding of the processing of the failure detection device 30. The present invention is not limited by a particular method of dividing up processing units or names. The processing of the failure detection device 30 can be divided into more processing units according to the processing contents. In addition, the processing of the failure detection device 30 can also be divided such that one processing unit includes more processings.

Furthermore, the electronic watermark signal generating device 23 is an example of an electronic watermark signal generating unit, the electronic watermark signal detection device 40 is an example of a collation data detection unit, the data collation failure determination unit 36 is an example of a failure determination unit, the addition unit 29 is an example of an addition unit, the hash table conversion unit 22 is an example of a first data conversion unit, the data generating unit 21 is an example of a collation data generating unit, the hash table restoration unit 35 is an example of a second data conversion unit, the hash table generating unit 28 is an example of a conversion table generating unit, the gain adjustment unit 26 is an example of a sound volume adjustment unit, and the impedance measurement device 60 is an example of a second failure detection device.

What is claimed is:

1. A failure detection device configured to detect a failure of a sound generating device outputting a sound based on sound data from a speaker, the failure detection device comprising:
    an electronic watermark signal generating unit configured to generate an electronic watermark signal including collation data used for collation of whether or not a sound is output from the speaker;
    the speaker configured to output the electronic watermark signal as a sound;
    a microphone configured to collect the sound output from the speaker;
    a collation data detection unit configured to detect the collation data from the electronic watermark signal included in the sound collected by the microphone; and
    a failure determination unit configured to determine presence or absence of the failure of the sound generating device, by collating the collation data detected by the collation data detection unit with the collation data included in the electronic watermark signal by the electronic watermark signal generating unit.

2. The failure detection device according to claim 1, wherein the electronic watermark signal generating unit generates the electronic watermark signal by spreading the collation data with a spread code, and
    the spread code is generated at random.

3. The failure detection device according to claim 2, further comprising an addition unit configured to add the electronic watermark signal to the sound data when the sound generating device outputs the sound based on the sound data from the speaker,
    the speaker outputs a stego-signal in which the electronic watermark signal is added to the sound data by the addition unit, and
    the collation data detection unit detects the electronic watermark signal from the stego-signal by reversely spreading the stego-signal with the spread code used for generating the electronic watermark signal.

4. The failure detection device according to claim 1, further comprising:
    a collation data generating unit configured to generate the collation data;
    a first data conversion unit configured to convert the collation data generated by the collation data generating unit into collation data after conversion using a conversion table; and
    a second data conversion unit configured to convert the collation data after the conversion into the collation data by using the conversion table,
    the electronic watermark signal generating unit generates an electronic watermark signal including the collation data after the conversion, and
    the collation data detection unit detects the collation data after the conversion from the electronic watermark signal included in the sound collected by the microphone.

5. The failure detection device according to claim 4, further comprising a conversion table generating unit configured to generate the conversion table at random.

6. The failure detection device according to claim 1, further comprising a sound volume adjustment unit configured to adjust sound volume at the time of outputting the electronic watermark signal from the speaker as a sound, and
the sound volume adjustment unit changes an adjustment amount of the sound volume according to whether or not the sound generating device outputs the sound based on the sound data from the speaker.

7. The failure detection device according to claim 6, wherein the sound generating device and the failure detection device are mounted on a mobile object, and
in a case where the sound generating device does not output the sound based on the sound data from the speaker,
the sound volume adjustment unit changes the adjustment amount of the sound volume according to a speed of the mobile object.

8. The failure detection device according to claim 1, wherein the failure detection device includes a second failure detection device configured to electrically detect a failure of the speaker, or acquires a detection result of the failure of the speaker from the second failure detection device, and
the failure determination unit determines presence or absence of a failure of the second failure detection device or the failure detection device by combining a determination result of the presence or absence of the failure according to the second failure detection device with a determination result of the presence or absence of the failure according to the failure detection device.

9. A mobile object mounting device on which the failure detection device according to claim 1 is mounted.

10. A failure detection method of a failure detection device configured to detect a failure of a sound generating device outputting a sound based on sound data from a speaker, the failure detection method comprising:
generating, by an electronic watermark signal generating unit, an electronic watermark signal including collation data used for collation of whether or not a sound is output from the speaker;
outputting, by the speaker, the electronic watermark signal as a sound;
collecting, by a microphone, the sound output from the speaker;
detecting, by a collation data detection unit, the collation data from the electronic watermark signal included in the sound collected by the microphone; and
determining, by a failure determination unit, presence or absence of the failure of the sound generating device, by collating the collation data detected by the collation data detection unit with the collation data included in the electronic watermark signal by the electronic watermark signal generating unit.

11. The failure detection method according to claim 10, wherein the electronic watermark signal is generated by spreading the collation data with a spread code, and
the spread code is generated at random.

12. The failure detection method according to claim 11, further comprising:
adding, by an addition unit, the electronic watermark signal to the sound data when the sound generating device outputs the sound based on the sound data from the speaker,
the speaker outputs a stego-signal in which the electronic watermark signal is added to the sound data by the addition unit, and
the collation data detection unit detects the electronic watermark signal from the stego-signal by reversely spreading the stego-signal with the spread code used for generating the electronic watermark signal.

13. The failure detection method according to claim 10, further comprising:
generating, by a collation data generating unit, the collation data;
converting, by a first data conversion unit, the collation data generated by the collation data generating unit into collation data after conversion using a conversion table; and
converting, by a second data conversion unit, the collation data after the conversion into the collation data by using the conversion table, wherein
the electronic watermark signal generating unit generates an electronic watermark signal including the collation data after the conversion, and
the collation data detection unit detects the collation data after the conversion from the electronic watermark signal included in the sound collected by the microphone.

14. The failure detection method according to claim 13, further comprising:
generating, by a conversion table generating unit, the conversion table at random.

15. The failure detection method according to claim 10, further comprising:
adjusting, by a sound volume adjustment unit, sound volume at the time of outputting the electronic watermark signal from the speaker as a sound, where
the sound volume adjustment unit changes an adjustment amount of the sound volume according to whether or not the sound generating device outputs the sound based on the sound data from the speaker.

16. The failure detection method according to claim 15, wherein the sound generating device and the failure detection device are mounted on a mobile object, and
in a case where the sound generating device does not output the sound based on the sound data from the speaker,
the sound volume adjustment unit changes the adjustment amount of the sound volume according to a speed of the mobile object.

17. The failure detection method according to claim 10, wherein the failure detection method includes detecting, by a second failure detection device, a failure of the speaker, or acquiring a detecting result of the failure of the speaker from the second failure detection device; and
the failure determination unit determines presence or absence of a failure of the second failure detection device or the failure detection device by combining a determination result of the presence or absence of the failure according to the second failure detection device with a determination result of the presence or absence of the failure according to the failure detection device.

* * * * *